United States Patent [19]

Mosley et al.

[11] 4,026,062

[45] May 31, 1977

[54] FISHING LINE SINKER

[76] Inventors: Thomas P. Mosley; Julio Dominguez, both of 140 NE. 163rd St., N. Miami Beach, Fla. 33162

[22] Filed: Apr. 9, 1976

[21] Appl. No.: 675,311

[52] U.S. Cl. .............................. 43/44.87; 43/44.91
[51] Int. Cl.² ...................................... A01K 95/00
[58] Field of Search ............ 43/44.87, 44.89, 44.9, 43/44.91, 44.92, 44.95, 43.12, 44.94

[56] References Cited

UNITED STATES PATENTS

| 2,241,851 | 5/1941 | Gilstrap | 43/44.9 |
| 2,284,564 | 5/1942 | Ebersole | 43/44.92 |
| 2,754,616 | 7/1956 | Law | 43/44.91 |
| 2,778,146 | 1/1957 | Peck | 43/44.9 |

Primary Examiner—Louis G. Mancene
Assistant Examiner—Peter K. Skiff
Attorney, Agent, or Firm—Joel Halpern

[57] ABSTRACT

A fish line sinker includes an elongated relatively heavy body in which there is a pair of longitudinally extending bores. One of the bores is dimensioned to slidably retain a fish line positioned therein and the other bore is dimensioned to clamp the fish line positioned therein such that it cannot move relative to the sinker body. The sinker body is slit radially so as to be separable to permit the insertion of a fish line in one of the bores, and a spring clip is provided to retain the separable body in its non-separated state. The sinker can thus be secured to the fish line without the need to cut the fish line, and the sinker can be slidably or fixedly secured to the fish line depending upon the bore selected to retain the fish line.

6 Claims, 3 Drawing Figures

FISHING LINE SINKER

BACKGROUND OF THE INVENTION

The prsent invention relates to fish line sinkers and more particularly to fish line sinkers which can be secured to the line without the need to cut the line.

The desirability of providing fish line sinkers which can be removed from the fish line without having to cut the line was recognized heretofore, and indeed such sinkers were known prior to this invention. U.S. Pat. No. 3,273,78 issued Sept. 20, 1966 to E.F. Lynch discloses a typical prior art sinker construction wherein the sinker was given a longitudinal slot and a longitudinal opening within which there is positionable a tube having a longitudinal slot and longitudinal opening. By aligning the slots of the sinker and tube a fish line can be drawn into the tube, and by rotating the tube relative to the sinker the fish line is captured within the sinker. The fish line can be secured between the tube and sinker when it is desired to prevent relative movement between the fish line and sinker for various types of operation familiar to fisherman.

However, frequently the inner tube became detached from the line and was either misplaced or lost thereby making it impossible to fit the sinker to the line. Even when the tube was not detached from the line certain inconvenience was encountered since in the winding of the line upon the reel for storage the tube prevented the complete winding of the line and resulted in a somewhat bulky assembly. Once detached the possibility of loss arose.

SUMMARY OF THE INVENTION

It is one object of the invention to provide a fish line sinker which can be secured to a fish line and removed therefrom without having to cut the line and not requiring the use of another sinker element cooperable in the securing of the sinker to the line.

Other objects and advantages of the invention will become readily apparent from the following description of the invention.

According to the present invention there is provided a fish line sinker comprising:

an elongated relatively heavy body having a pair of bores extending longitudinally therethrough, one of said bores being dimensioned to slidably retain a fish line positioned therein and the other of said bores being dimensioned to clamp a fish line positioned therein and thereby prevent longitudinal movement of the fish line;

said body being radially slit to permit separation thereof for the positioning of a fish line in one of said bores;

and means releasably secured to said sinker body for retaining said body in a non-separated state to thereby retain the fish line within said body and said body secured to the fish line.

BRIEF DESCRIPTION OF THE DRAWINGS

In order that the invention may be fully comprehended it will now be described, by way of example, with reference to the accompanying drawings in which.

DETAILED DESCRIPTION OF THE INVENTION

Figure 1:
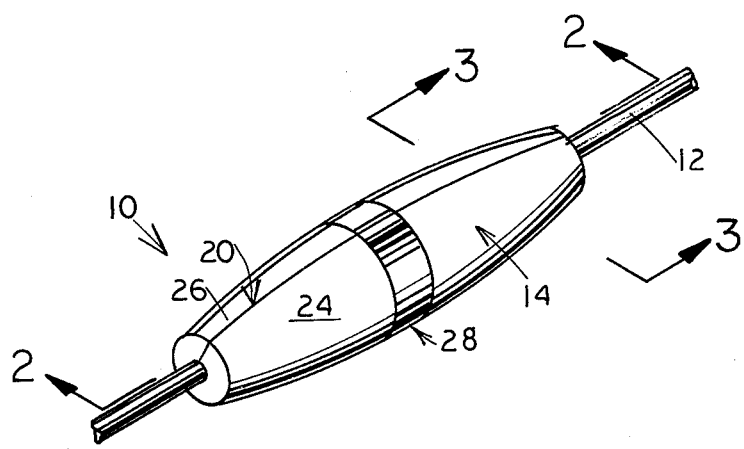
FIG. 1 is a perspective view of a fish line sinker embodying the features of the invention secured to a fish line.
Figure 2:
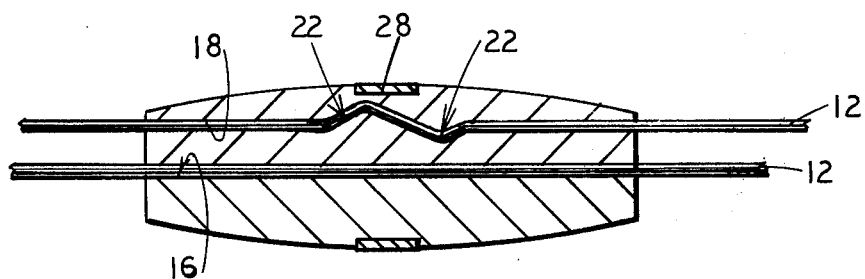
FIG. 2 is a cross-sectional view of a half section of the sinker shown in FIG. 1 taken along line 2—2 thereof.

Referring to the drawings there is shown generally, as indicated by reference numeral 10, a fish line sinker. The sinker is secured to a fishing line 12.

As depicted, and in accordance with the presently preferred embodiment, the sinker comprises an elongated body 14 which may desirably be given the configuration of an ellipsoid. The body is given a pair of longitudinally extending bores 16, 18. The first of such bores 16 is preferably formed in the body so as to extend along the longitudinal axis of the body. The bore is dimensioned so as to permit the positioning of a fishing line 12 therein so as to be freely slidable within the sinker. As can be seen most clearly from FIG. 3 bore 16 is thus desirably cylindrical.

The second bore 18 is formed within the sinker body in radially spaced relation to bore 16. As will be described hereinafter, the sinker body is separable along a radial slit line 20 and bore 18 is located along such radial slit line. Bore 18 is dimensioned to receive the fishing line therein in such manner that when the sinker body is in a non-separated state the fishing line is clamped within the body and no relative movement between the line and the sinker body is permitted. Such clamping of the line so as to prevent longitudinal movement thereof within the sinker can be accomplished by providing the bore 18 with at least one and preferably a pair of sharp bends 22 therein. Such bends may desirably be formed in proximity to the longitudinal midpoint of the sinker body.

As stated above, the sinker body 14 is slit radially so as to permit separation thereof for the insertion of the fishing line into the selected bore upon whether or not relative movement between the sinker body and fishing line is desired. Since it is presently preferred that the sinker be made of a metal such as lead the body is desirably slit completely therethrough so as to be subdivided into a pair of longitudinally extending half sections 24, 26. The half sections are each given a circumferentially extending groove 28 which extends throughout substantially the entire extent of the exterior surface of the half section. The grooves are located in each half section such that when such sections are brought together in end to end alignment the grooves are in alignment. The grooves are dimensioned to receive a spring clip 28 therein which is tensioned to retain the half sections in closely engaged relation. The grooves are sufficiently deep so as to accept the clip and form a smooth exterior surface on the sinker in which the exterior surface of the clip is substantially flush with the adjacent exterior surfaces of the sinker body.

It will be appreciated, of course, that the sinker body can be made of a synthetic plastics material which is resilient and provided with weights if needed in order to serve effectively as a sinker. Also, instead of a spring clip the body may be provided with a spring hinge member (not shown) which is positioned in a longitudinal edge of the body and is thus adapted to maintain the half sections yieldably in their closed position so as to retain the fishing line therein.

Figure 3:
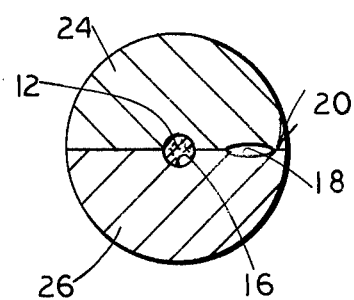
FIG. 3 is an end cross-sectional view of the sinker shown in FIG. 1 taken along line 3—3 thereof.

As depicted in FIG. 3 the bore 18 may be formed so as to compress the fishing line within an elliptical configuration in which the short axis is less than the uncompressed diameter of the fishing line.

From the foregoing it will be seen that a fishing line sinker has been provided which, through the separable nature of the sinker body and the provision of a pair of bores in such body, affords a unitary assembly for selectively securing the fishing line to the sinker either slidably or fixedly thereto.

I claim:

1. A fish line sinker comprising:
   an elongated relatively heavy body having a pair of bores extending longitudinally therethrough, one of said bores being dimensioned to slidably retain a fish line positioned therein and the other of said bores being dimensioned to clamp a fish line positioned therein and thereby prevent longitudinal movement of the fish line, a first of said bores being coaxial with the longitudinal axis of said body and the other of said bores being located along the radial line at which said body is separable;
   said body being radially slit to permit separation thereof for the positioning of a fish line in one of said bores;
   and means releasably secured to said sinker body for retaining said body in a non-separated state to thereby retain the fush line within said body and said body secured to the fish line.

2. A fish line sinker according to claim 1, wherein said means for retaining said body in a non-separated state comprises a spring clip, a circumferentially extending groove being formed in said body dimensioned to receive said spring clip such that the exterior surface of said clip is substantially flush with the adjacent exterior surfaces of the sinker body.

3. A fish line sinker according to claim 1, wherein said other bore is formed with at least one sharp bend therein in proximity to the longitudinal mid-point of the sinker body.

4. A fish line sinker according to claim 2, wherein said sinker body is slit so as to divide same into first and second longitudinally extending half sections, said groove extending throughout substantially the entire circumferential extent of each of said half sections.

5. A fish line according to claim 1, wherein said sinker body is made of metal.

6. A fish line sinker according to claim 1, wherein said other of said bores is of non-circular configuration.

* * * * *